(12) United States Patent
Yu

(10) Patent No.: US 12,232,237 B2
(45) Date of Patent: Feb. 18, 2025

(54) INTELLIGENT OUTDOOR LIGHTING SYSTEM AND ULTRASONIC AUDIO GENERATOR

(71) Applicant: Ledup Manufacturing Group Limited, Irwindale, CA (US)

(72) Inventor: Jing Jing Yu, Irwindale, CA (US)

(73) Assignee: Ledup Manufacturing Group Limited, Irwindale, CA (US)

( * ) Notice: Subject to any disclaimer, the term of this patent is extended or adjusted under 35 U.S.C. 154(b) by 120 days.

(21) Appl. No.: 18/099,759

(22) Filed: Jan. 20, 2023

(65) Prior Publication Data

US 2023/0239990 A1 Jul. 27, 2023

Related U.S. Application Data

(60) Provisional application No. 63/267,212, filed on Jan. 27, 2022.

(51) Int. Cl.

| H05B 47/19 | (2020.01) |
|---|---|
| F21V 33/00 | (2006.01) |
| H05B 45/20 | (2020.01) |
| F21W 131/10 | (2006.01) |

(52) U.S. Cl.
CPC ........... *H05B 47/19* (2020.01); *F21V 33/006* (2013.01); *H05B 45/20* (2020.01); *F21W 2131/10* (2013.01)

(58) Field of Classification Search
CPC ....... H05B 47/19; H05B 45/20; F21V 33/006; F21W 2131/10
See application file for complete search history.

(56) References Cited

U.S. PATENT DOCUMENTS

| 2002/0070688 | A1* | 6/2002 | Dowling | F21S 4/28 |
|---|---|---|---|---|
| | | | | 315/312 |
| 2010/0295481 | A1* | 11/2010 | Van Endert | F21V 23/0471 |
| | | | | 315/312 |
| 2013/0063042 | A1* | 3/2013 | Bora | H05B 45/20 |
| | | | | 315/292 |
| 2014/0001963 | A1* | 1/2014 | Chobot | H05B 47/19 |
| | | | | 315/153 |

FOREIGN PATENT DOCUMENTS

| CN | 206182165 U | * | 5/2017 | |
|---|---|---|---|---|
| WO | WO-2017003090 A1 | * | 1/2017 | ............. A01M 1/02 |

* cited by examiner

*Primary Examiner* — Henry Luong
(74) *Attorney, Agent, or Firm* — William W. Cochran; Cochran Freund & Young LLC

(57) ABSTRACT

Disclosed is an outdoor lighting system that utilizes a smart phone to control the outdoor lighting system. In addition, this system may include an ultrasonic audio generator for repelling bugs and other animals. Various lighting themes can be applied to the lamps using an application program stored on the smart phone. Bug lights to repel flying insects and UV lights can be included in the lamps to repel birds and other animals, including bats.

5 Claims, 6 Drawing Sheets

INTELLIGENT OUTDOOR LIGHTING SYSTEM AND ULTRASONIC AUDIO GENERATOR

BACKGROUND

Light emitting diodes (LEDs) have become very useful in lighting applications because of the amount of lumens that LEDs can generate for the amount of power required for the LEDs. In addition, because LEDs require such low power, LEDs do not operate at elevated temperatures, which can cause fires. In that regard, LEDs are both safe to operate and consume low power.

SUMMARY

The present invention may therefore comprise an outdoor lighting system that is capable of individually controlling a plurality of lamps using smart phone wireless control signals generated by an application running on a smart phone comprising: a controller that receives the smart phone wireless control signals generated by the smart phone and generates controller wireless control signals for individually controlling the plurality of lamps, the controller comprising: a controller transceiver that receives the smart phone wireless control signals from the smart phone; a logic device that receives the smart phone wireless control signals from the controller transceiver and generates controller control signals; a controller transceiver that receives the smart phone wireless control signals from the smart phone and wirelessly transmits the controller control signals to the plurality of lamps; at least a portion of the plurality of lamps comprising: a lamp transceiver that receives the controller wireless control signals from the controller and retransmitted controller wireless control signals from other lamps and retransmits the controller wireless control signals; a lamp logic device that receives the controller wireless control signals from the lamp transceiver and generates light source instructions for individually operating light sources in the plurality of light emitting diode lamps.

The present invention may further comprise a method of controlling an outdoor lighting system comprising: using an application program on a smart phone to select lamps to be controlled; selecting a preset lighting control process from a plurality of preset lighting control processes provided by the application program to control the lamps and create a selected preset lighting control process; transmitting smart phone control signals from the smart phone to a controller, the smart phone control signals corresponding to the selected preset lighting control process; generating controller wireless control signals from the controller; transmitting the controller wireless control signals from the controller to at least one lamp that is within range of the controller wireless control signals generated by the controller in accordance with the selected preset lighting control process; retransmitting the controller wireless control signals from the at least one lamp that is in range of the controller wireless control signal generated by the controller so that additional lamps receive the controller wireless control signal; implementing the selected preset lighting control process on each lamp of the selected lamps to be controlled so that each lamp can be separately controlled.

DETAILED DESCRIPTION OF THE EMBODIMENTS

Figure 1:
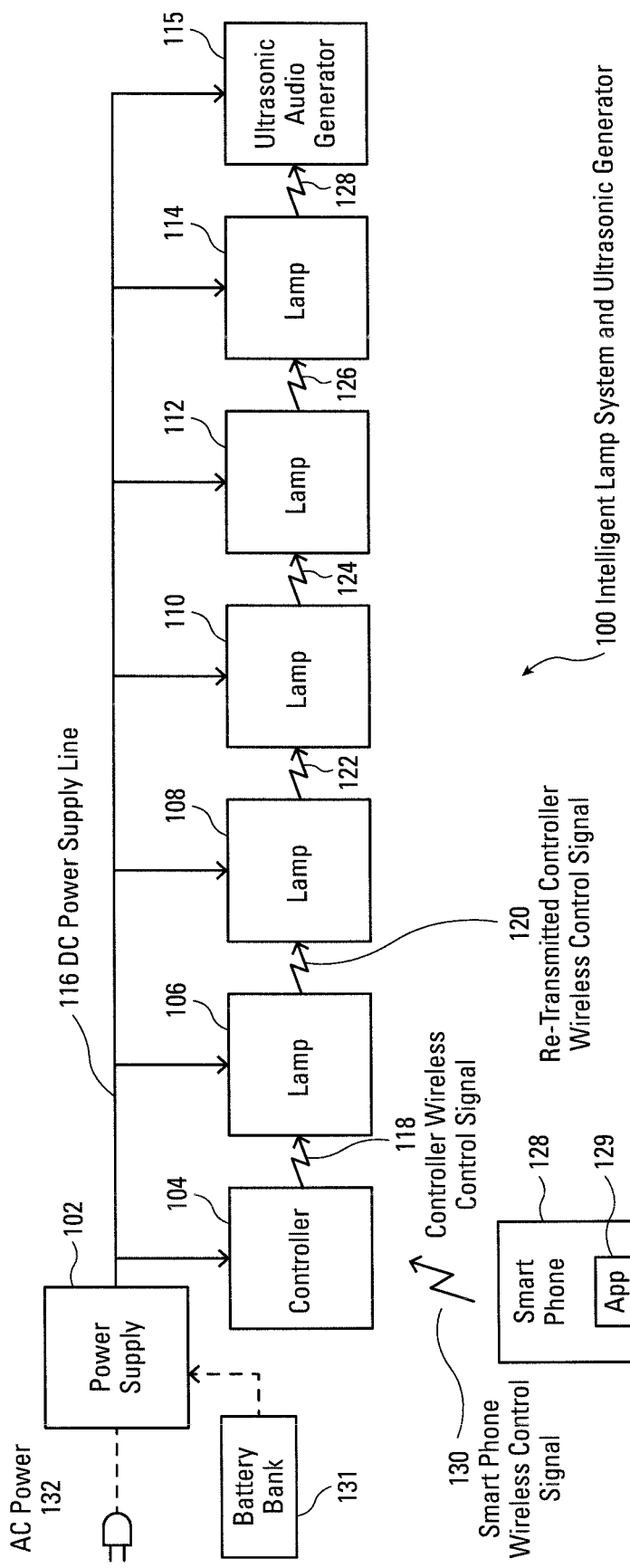
FIG. 1 is a schematic block diagram of an embodiment of an intelligent lamp system and ultrasonic audio generator.

FIG. 1 is a schematic block diagram of an intelligent lamp system and ultrasonic audio generator 100. As illustrated in FIG. 1, AC power can be supplied through a wall plug 132 to a power supply 102. Alternatively, DC power can be provided by a battery bank 131. The power supply 102 provides 12V power to DC power supply line 116. Controller 104 and lamps 106, 108, 110, 112, 114, or any desired number of lamps, can be connected to the DC power supply line 116.

Of course, each of the lamps 106-114 and ultrasonic audio generator 115 can have separate power supplies that can be connected to AC power or separate battery banks, depending upon the implementation of the intelligent lamp system and ultrasonic audio generator 100. In addition, an optional ultrasonic audio generator 115 can also be connected to the DC power supply line 116. The term "lamp," as used in this application refers to devices for generating light energy and also includes other devices, such as ultrasonic audio generators, such as ultrasonic audio generator 115, illustrated in FIG. 1. As such, the term "lamp" includes other devices other than a light source, such as light source 306, illustrated in FIG. 3. In addition, lamps can comprise LEDs that are connected to a light string or separate lighting displays, such as wreaths, stars, signage or other types of illumination, which should all be considered to fall under the term "lamp." Smart phone 128 uses an application (app) 129 and generates a smart phone wireless control signal 130, such as a Bluetooth signal. Application 129 provides a plurality of choices to the user for lighting and controlling lamps 106-114. The application 129 may also include choices for controlling ultrasonic audio generator 115. Controller 104 receives the smart phone wireless control signal 130 and generates a controller wireless control signal 118 that is transmitted to lamps 106-114, and in some instances, also to ultrasonic audio generator 115. Of course, the smart phone wireless control signal 130 can comprise any kind of desired signal transmission, such as a Bluetooth signal, a signal using a Zigbee protocol or other wireless protocol that is capable of transmitting wireless control signals to controller 104. The use of a smart phone 128 is very handy since many people have smart phones and a separate wireless transmitter is not required to control the intelligent lamp and ultrasonic audio generator system 100. The user can simply download the app 129 to the smart phone 128 to operate the intelligent lamp and ultrasonic audio generator system 100 without using a separate wireless remote, which may become displaced or lost.

As also shown in FIG. 1, the controller 104 receives the smart phone wireless control signal 130, e.g., Bluetooth signal, from the smart phone 128 and generates the controller wireless control signal 118. The controller 104 is illustrated and described in more detail with respect to FIG. 2. The controller wireless control signal 118 is transmitted to lamps 106-114 and ultrasonic audio generator 115 that are within range of the controller 104. The controller wireless control signal 118 can also be of any desired wireless protocol, such as Bluetooth, Zigbee and other wireless protocols. As set forth in more detail below, each of the lamps 106-114 and the ultrasonic audio generator 115 have transceivers that are capable of regenerating and retransmitting the controller wireless control signal 118 so that lamps 106-114 and ultrasonic audio generator 115, which are out of range of the controller 104, receive the retransmitted wireless control signals 120, 122, 124, 126, 128 from the various lamps 106-114 and ultrasonic audio generator 115. In this manner, the controller wireless control signal 118 does not have to have enough power to transmit to all of the lamps 106-114 and ultrasonic audio generator 115 that may be located at a significant distance from the controller 104, such as several hundred meters. In addition, FCC licenses are not required for these low power transmissions.

Figure 2:
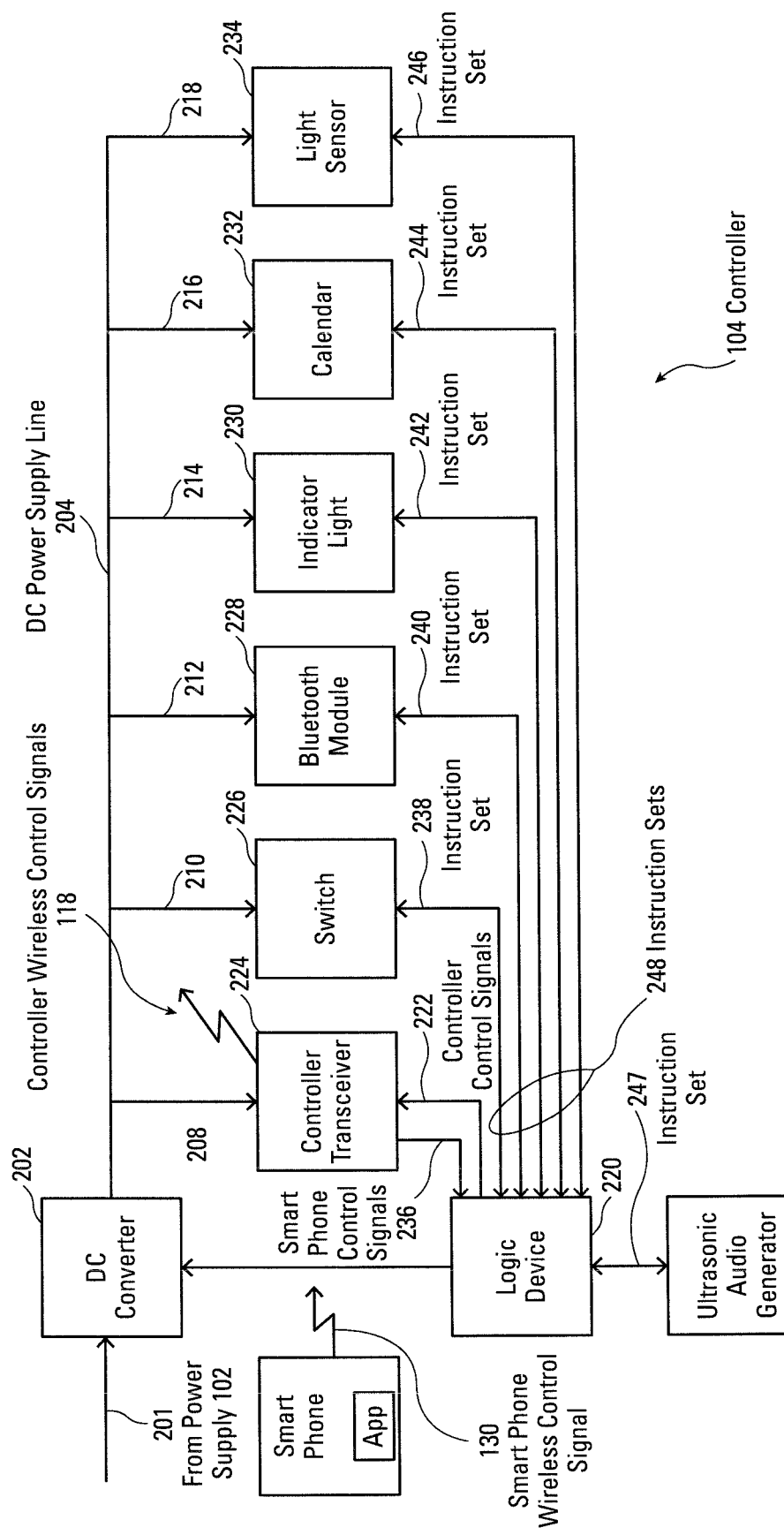
FIG. 2 is a schematic block diagram of an embodiment of a controller.

FIG. 2 is a schematic block diagram of an embodiment of a controller 104 (FIG. 1). As illustrated in FIG. 2, a DC converter circuit 202 receives DC power over connector 201 from power supply 102. DC converter 202 converts the 12V DC power from the power supply 102 to voltages that are used by the various devices 224, 226, 228, 230, 232, 234. For example, logic device 220, which is connected to the DC converter 202, may use a voltage supply of 3.3V, 1.8V or 1.2V. The other devices 224-234 may also use a DC voltage of 3.3V, 1.8V or 1.2V. Power is supplied to devices 224-234 by voltage supply connectors 208-218. Logic device 220 generates instruction sets 248 that are used to control the various devices 226-234. Instruction sets 248 comprise instruction set 238 to switch 226, instruction set 240 to Bluetooth module 228, instruction 242 to indicator light 230, instruction set 244 to calendar 232 and instruction set 246 to light sensor 234. A separate instruction set (not shown in FIG. 2) is an instruction set that is to ultrasonic audio generator 115, illustrated in FIG. 1. Instruction set 238 controls switch 226. Switch 226 is used to switch between a twenty-four hour mode and the use of light sensor 234 that detects light to determine night and day. Data is transmitted from switch 226 to logic device 220 as instruction set 238. Instruction set 240 controls and receives data from Bluetooth module 228. Bluetooth module 228 packages the data from the logic device 220 for transmission as a Bluetooth signal. Instructions are sent from Bluetooth module 228 to logic device 220 to package data. As mentioned above, other protocols can be used, such as Zigbee. In that case, a Bluetooth module 228 would not be necessary, but another module, such as a Zigbee module, may be used to package the data for transmission as a controller wireless control signal 118 by controller transceiver 224. Instruction set 242 controls and receives data from indicator light 230. Indicator light 230 indicates operation of the intelligent lamp system and ultrasonic audio generator 100 (FIG. 1). Instruction set 244 controls and receives data from calendar 232. Calendar 232 schedules the operation of the system, such as the generation of a light theme or light process at certain hours and on certain days. Further, calendar 232 can schedule the operation of various lights and systems, including the ultrasonic audio generator 115 (FIG. 1), ultraviolet lamps 106-114 to repel birds and bug lights to repel bugs, as described in more detail below. Calendar data is transmitted from calendar 232 to logic device 220 via connector 244. Instruction set 246 controls and receives data from light sensor 234. Light sensor 234 is used to detect ambient light to determine if the lamps 106-114 (FIG. 1) should be activated by determining if low light conditions exist, such as at night. Data from light sensor 234 is sent over connector 246 to logic device 220. Controller transceiver 224 generates a controller wireless control signal 118 that may be a 2.4 GHz signal that is transmitted to the various lamps 106-114 and the ultrasonic audio generator 115 of FIG. 1. Alternatively, a computer bus can be used to connect the logic device 220 and devices 224-234. Logic device 220 may comprise a digital computer, a state machine or other logic device that receives smart phone control signals 236 and generates instruction sets 248 in response to the smart phone control signals 236. The smart phone control signals 236 are transmitted by the controller transceiver 224 in response to the smart phone wireless control signal 130 from smart phone 128. Logic device 220 then generates controller control signals 222 that are transmitted to the controller transceiver 224 for transmission as controller wireless control signals 118 that are transmitted to the various lamps 106-114 and ultrasonic audio generator 115, illustrated in FIG. 1.

Figure 3:
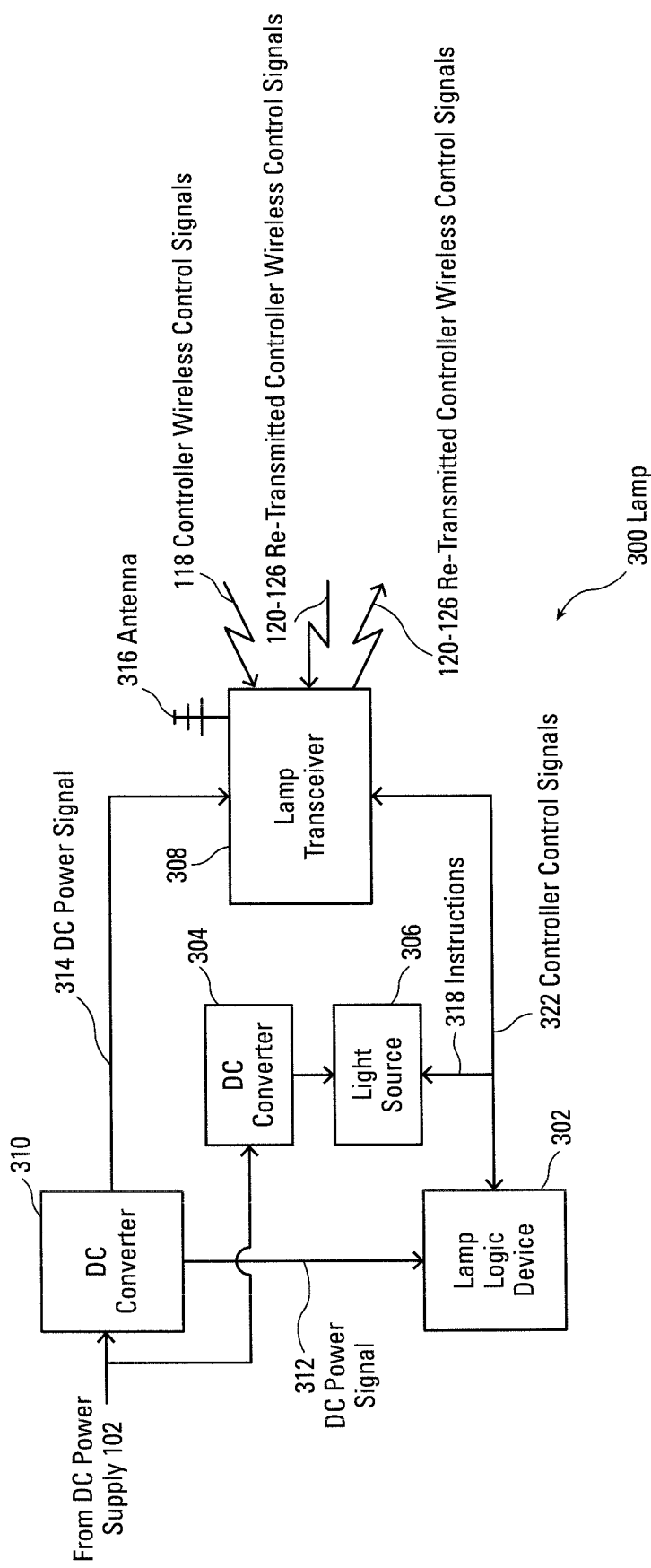
FIG. 3 is a schematic block diagram of an embodiment of a lamp.

FIG. 3 is a schematic block diagram of a lamp 300, which corresponds to the lamps 106-114, illustrated in FIG. 1. The exemplary lamp 300 has a DC converter 310 that receives DC power from DC power supply 102. Again, the DC converter 310 converts the 12V DC signal from the DC power supply 102 to a lower voltage signal, such as 3.3V, 1.8V or 1.2V. The DC power signal 312 is applied to the lamp logic device 302. DC power signal 314 is applied to lamp transceiver 308. A separate DC converter 304 is connected to the DC power supply 102 and generates a different DC output voltage, which is applied to the light source 306. Voltages from 2V to 3V are typical for powering most LEDs. Different types of LEDs require different voltages. For example, a 2.2V DC signal may be produced by the DC converter 304 and applied to the light source 306. Logic device 302 receives the control signal 236 of FIG. 2 from the lamp transceiver 308 and generates instruction set 318 that is sent to the light source 306. These instructions instruct the light source 306 regarding illumination. Lamp logic device 302 may comprise a microprocessor that is controlled by controller control signals 322, a state machine or other logic device that is capable of generating instructions 318 to control light source 306. Received controller wireless control signals 118 or retransmitted controller wireless control signals 120-126 are retransmitted by lamp transceiver 308 as retransmitted controller wireless control signals 120-126.

Figure 4:
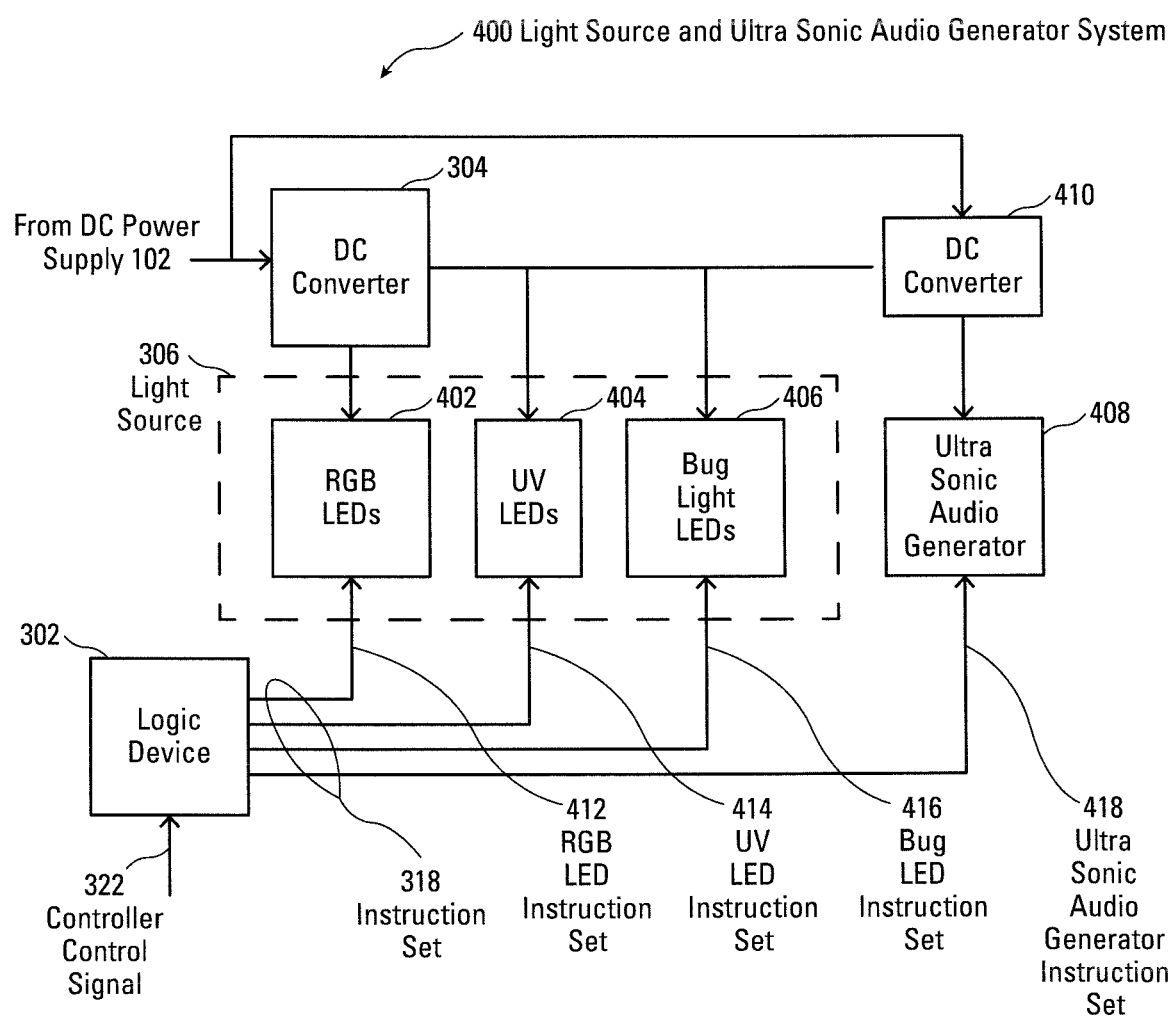
FIG. 4 is a schematic block diagram of a light source system and an ultrasonic audio generator.

FIG. 4 is a schematic block diagram of a light source and ultrasonic audio generator system 400. As illustrated in FIG. 4, DC power from the DC power supply 102 is received by the DC converter 304 and DC converter 410, which convert the DC power from the DC power supply 102 to lower voltages. The lower voltage from the DC converter 304 is applied to the primary color or red, green, blue (RGB) LEDs 402, the UV LEDs 404 and the bug light LEDs 406. Each of these may require a separate voltage supply. As also shown in FIG. 4, DC power from the DC power supply 102 may be directly applied to ultrasonic audio generator 408 or from the DC convertor 304 or DC converter 410. Logic device 302 receives the controller control signal 322 from transceiver 308 (FIG. 3) and generates instruction sets 318, including RGB LED instruction set 412, for controlling RBG LEDs 402, UV LED instruction set 414 for UV LEDs 404, bug LED instruction set 416 for bug light LEDs 406 and ultrasonic audio generator instruction set 418 for ultrasonic audio generator 408. Transceiver 308 (FIG. 3) transmits control signal 322 (FIG. 3) from wireless control signal 118 (FIG. 3), received by transceiver 308, as illustrated in FIG. 3. Of course, each of these devices 402-408 are optional items and do not have to be included in each light source and ultrasonic audio generator system 400. For example, one light source system 400 may only include RGB LEDs. Other light source systems 400 may only include an ultrasonic audio generator 408. Obviously, any combination of the elements shown in FIG. 4 can be included in the light source and ultrasonic audio generator system 400. The RGB LED instructions set 412 from the logic device 302 may include the separate intensities of each of the red, green and blue LEDs in each lamp so that a desired color is created by the RGB LEDs 402. Since red, green and blue are primary colors, the intensity of each of these LEDs allows the system to create any desired color since the colors from the LEDs combine so that a viewer perceives different colors as a result of the mixing of the radiation of each of the RGB diodes at different powers. Secondary colors may also be used, such as cyan, magenta and yellow. The UV LEDs 404 can be used to repel birds from the area. Specific frequencies of UV light are perceived by birds and birds are repelled by those UV lights. In addition, birds can see certain frequencies of UV light depending on the species. UV light can be used to illuminate the obstacles that may be placed to keep birds away, such as mono filament fishing line. In some cases, even certain species of birds can be repelled using specific frequencies of UV LEDs 404. Similarly, bug light LEDs 406 can be used to repel bugs at certain light frequencies. Also, the ultrasonic audio generator 408 can repel many different animals. For example, certain ultrasonic frequencies can be used to repel bugs. Other frequencies can repel bats, birds, rats and other varmints. Some ultrasonic frequencies can be used to repel dogs and cats. In other words, the presently disclosed system can be an effective device for repelling various animals. For example, outdoor restaurants, especially in warmer climates such as Florida, may attract birds, which become a large nuisance. Insects, such as cockroaches, may also be attracted to outdoor restaurants. The present system can be used in combination with a lighting source to repel birds and insects while providing decorative lighting to the outdoor restaurant. As another example, bats can be repelled by both light and ultrasonic emissions. Houses that have bats in the attic can utilize a light source and ultrasonic audio generator system 400, which may use UV LEDs or high frequency visible LEDs, in combination with an ultrasonic audio generator to drive bats out of an attic area. Since it is illegal to poison bats, such a system can be very useful in displacing bats from an attic, especially if an established colony of bats has been present in an attic for some period of time.

Figure 5:
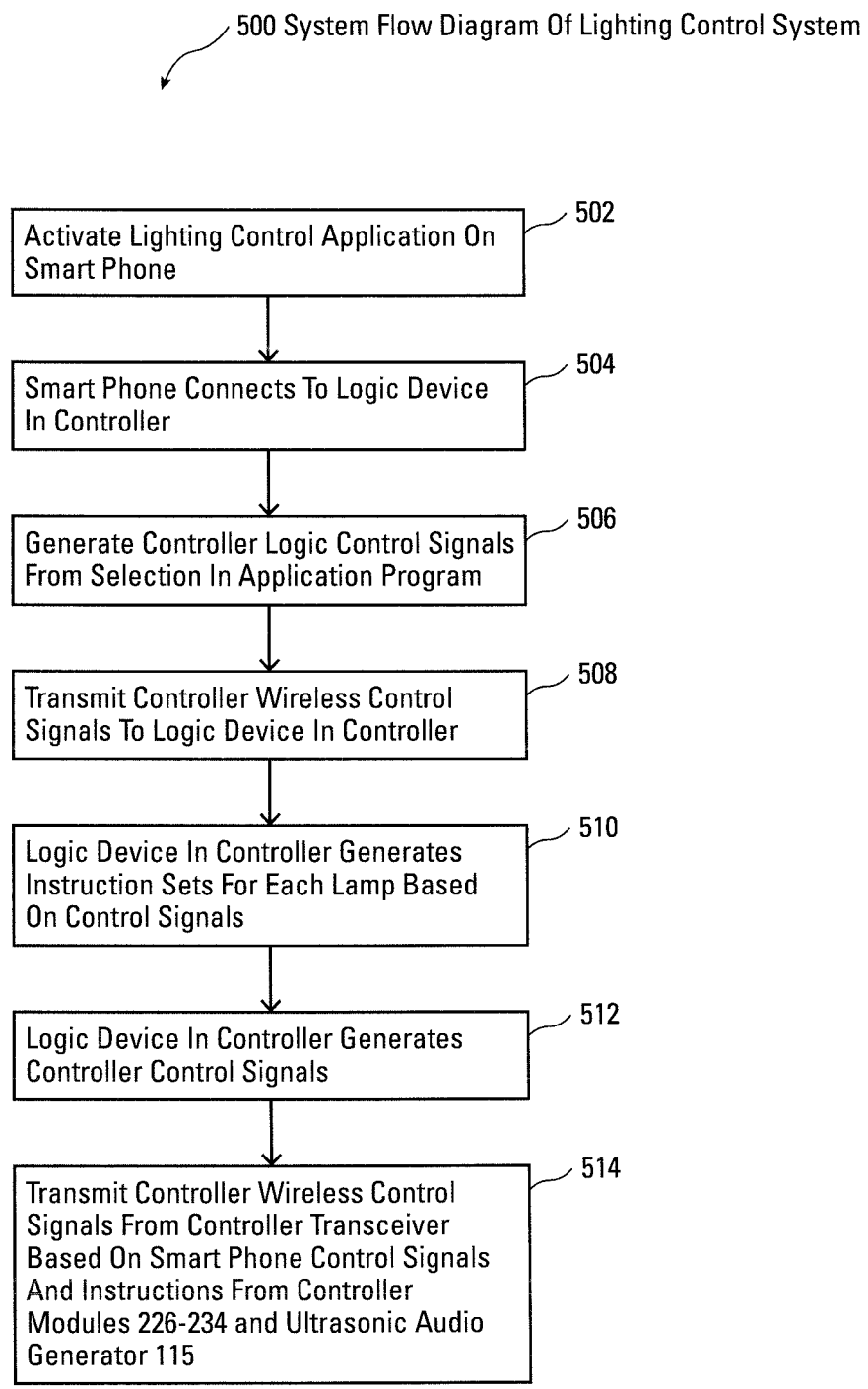
FIG. 5 is an embodiment of a system flow diagram for a lighting control system.

FIG. 5 is a system flow diagram of a lighting control system for controlling the lamps 106-114, illustrated in FIG. 1. As illustrated in FIG. 5, the process starts by activating the lighting control application on the smart phone at step 502. At step 504, the smart phone then connects to the logic device, such as logic device 220 in controller 104 of FIG. 1. The application 129 in the smart phone 128 (FIGS. 1 and 2) generates controller control signals 236 based upon selections made by the user of the application program in the smart phone, at step 506. At step 508, the smart phone 128 transmits controller wireless control signals 118 (FIG. 1), such as a Bluetooth signal, to the controller transceiver 224 in the controller 104 (FIG. 1). At step 510, the logic device 220 generates instruction sets 248 for operation of each of the lamps 106-114 and the ultrasonic audio generator 115 from the smart phone control signals 236 to separately control lamps 106-114 and ultrasonic audio generator 115 (FIG. 2). At step 512, logic device 220 generates controller control signals 222 for operating lamp 106-114 and ultrasonic audio generator 115. At step 514, controller transceiver 224 transmits controller wireless control signals from controller transceiver 224 based upon smart phone control signals 236 and instructions from controller modules 226-234 and ultrasonic audio generator 115 via instruction set 247.

Figure 6:
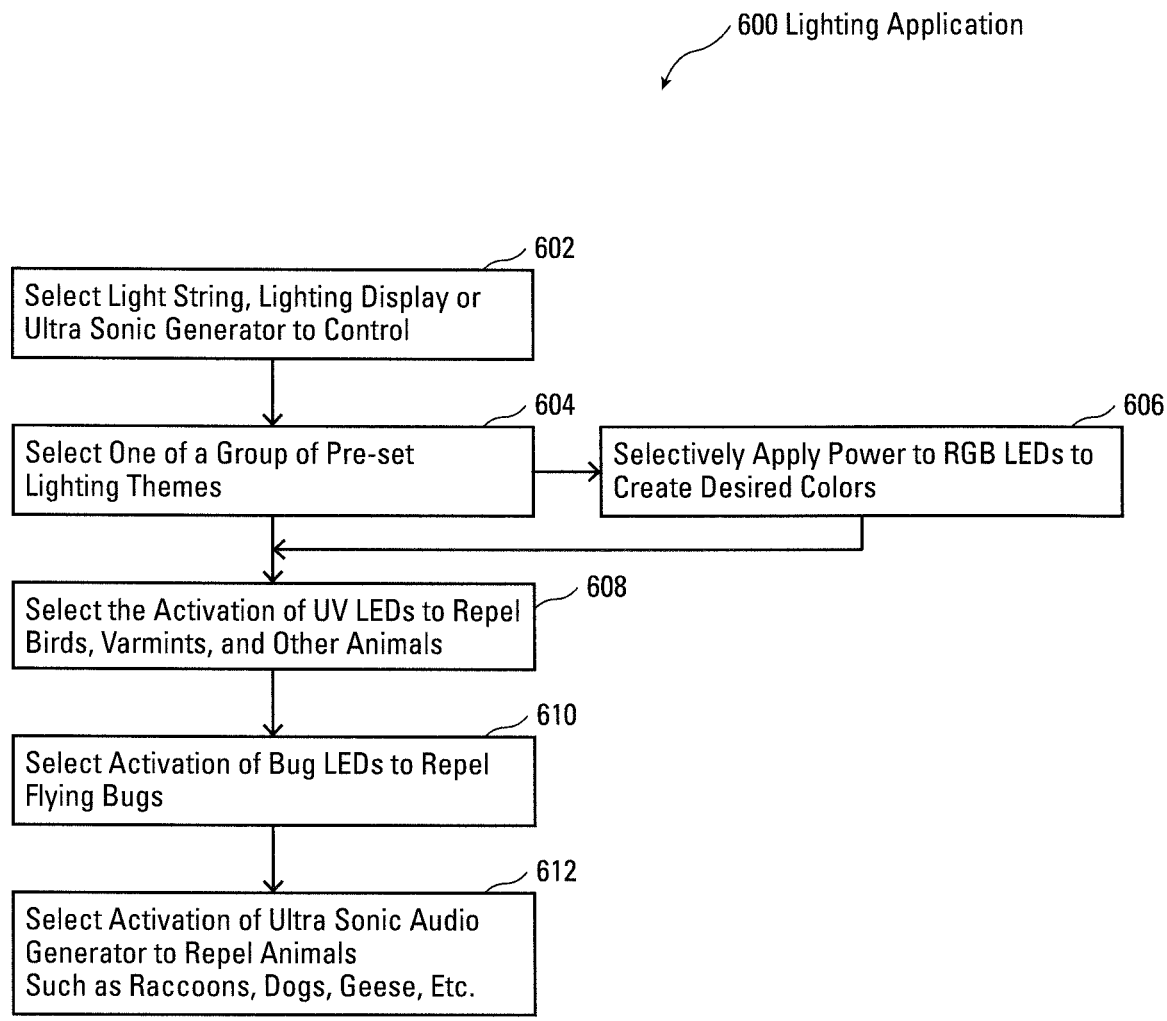
FIG. 6 is an embodiment of a lighting application and activation of an ultrasonic audio generator.

FIG. 6 is an embodiment of a flow diagram for a lighting application 600. Of course, many different lighting applications can be used depending upon the manufacturer and the desires of the user. FIG. 6 is simply one example of an application that can be used with the systems disclosed herein. As illustrated in FIG. 6, the process starts at step 602 by selecting a light string or a series of light displays or lamps, or ultrasonic audio generator, that are desired to be controlled. The light strings, individual lamps and ultrasonic audio generator may be identified in the application once the application identifies the one or more light strings or lamps or other devices that are detected by the application program. The process then proceeds to step 604 to select one of a group of pre-set combinations of lamps and the ultrasonic audio generator in various lighting themes or sequences that can be used to control the lamps and other devices. For example, the user can select colors for each of the LEDs and cause those colors to change. In addition, the LEDs can be flashed, faded in, faded out, twinkled or controlled in other ways by selecting a pre-set program that controls the operation of the LEDs and their colors. As another example, one program may select a set of colors for the LEDs, cause the LEDs to fade off and then cause the LEDs to fade on with different colors. Another program may cause the LEDs to blink and change colors for each blink. As indicated in FIG. 6, step 606 discloses that power can be selectively applied to RGB LEDs to create desired colors when each of the RGB LEDs is illuminated with a specific power to create a desired color. The process then proceeds to step 608 where the user can select activation of the UV LEDs to repel birds and other animals, such as insects. At step 610, the user can select activation of bug light LEDs to repel flying bugs, such as mosquitos. In an outdoor setting, such as a restaurant or even for home use, bug light LEDs can be very useful in repelling mosquitos and other flying bugs. At step 612 the user can select activation of the ultrasonic audio generator 408 (FIG. 4) to repel animals, such as rats, racoons, dogs, geese, some insects and other varmints.

As such, various embodiments have been presented of the present invention that allow control of light sources, such as light source system 400 (FIG. 4), using a smart phone 128 to control illumination of various lamps, such as lamps 106-114 and control an ultrasonic audio generator 115 (FIG. 1). In outdoor settings, the system of the present invention can be used to provide both decorative lighting as well as light and ultrasound to repel flying insects, bugs, birds and other animals, such as dogs, racoons and other varmints. The disclosed system utilizes a smart phone that has an application that allows the user to select pre-set sequences for controlling the various lamps and ultrasonic audio generator in various preselected ways. The smart phone app may also allow a user to individually control both lamps and ultrasonic audio generators in a manner desired by a user.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An outdoor lighting and pest control system that is capable of individually controlling a plurality of lamps using smart phone wireless control signals generated by an application running on a smart phone to create a decorate light system that is also capable of repelling rodents and birds in an outdoor environment comprising:
    a controller that receives said smart phone wireless control signals generated by said smart phone and generates controller generated control signals for individually controlling said plurality of lamps, said controller comprising:
        a controller transceiver that receives said smart phone wireless control signals from said smart phone and said controller generated control signals and transmits said controller generated control signals to said plurality of lamps;
        a logic device that receives said smart phone wireless control signals from said controller transceiver and generates said controller generated control signals for transmission by said controller transceiver to said plurality of lamps;
    at least one of said plurality of lamps comprising:
        a lamp transceiver that receives said controller generated control signals from said controller transceiver and retransmits said controller wireless control signals to lamps of said plurality of lamps that are out of range of said controller transceiver;
        a lamp logic device connected to said lamp transceiver that receives said controller wireless control signals from said lamp transceiver and generates light source instructions for individually operating light sources in said plurality of light emitting diode lamps:
    at least one ultrasonic audio generator that constitutes at least one of said plurality of lamps that receives said controller generated control signals and generates ultrasonic signals having a frequency that is selected to repel rodents:
    at least one ultraviolet lamp that constitutes at least one of said plurality of lamps that receives said controller generated control signals and generates ultraviolet light that has a frequency that is selected to repel birds:
    a plurality of primary color combination lamp having light emitting diodes that receive said controller generated control signals that are separately controlled to create a desired color for said decorative light system.

2. The outdoor lighting system of claim 1 wherein at least one of said plurality of light emitting diode lamps comprise light emitting diode displays.

3. A method of controlling an outdoor lighting and pest control system to create a decorative lighting system that also repels rodents and birds in an outdoor environment comprising:
    using an application program on a smart phone to select lamps of said outdoor lighting and pest control system to be controlled;
    selecting a preset system control process from a plurality of preset lighting system control processes provided by said application program to control said lamps to create a selected preset system control process;
    transmitting smart phone control signals from said smart phone to a controller, said smart phone control signals corresponding to said selected preset system control process;
    generating controller wireless control signals using said controller in response to said smart phone control signals;
    transmitting said controller wireless control signals from said controller to at least one lamp that is within range of said controller wireless control signals generated by said controller in accordance with said selected preset system control process;
    retransmitting said controller wireless control signals from said at least one lamp that is in range of said controller wireless control signal generated by said controller so that additional lamps that are out of range of said controller wireless control signals receive a retransmitted controller wireless control signal;
    controlling an ultrasonic audio generator with said controller wireless control signals or said retransmitted wireless control signals to generate an ultrasonic signal at a frequency selected to repel rodents;
    controlling at least one ultraviolet LED lamp to generate an ultraviolet light signal having a frequency that is selected to repel birds:
    controlling in at least one color lamp having a plurality of color diodes that are separately controlled to generate selected decorative color light for said decorative lighting system:
    implementing said selected preset system control process on each lamp of said selected lamps to be controlled so that each lamp can be separately controlled.

4. The process of claim 3 further comprising:
    using said application program to further select an ultrasonic audio generator that can be separately controlled;
    selecting a frequency for said ultrasonic audio generator using said application program that is optimal for repelling rats.

5. The process of claim 4 further comprising:
    separately controlling said at least one ultrasonic lamp using said application program to repel certain species of birds that frequent an outdoor area where said outdoor lighting and pest control system is located.

* * * * *